No. 645,145. Patented Mar. 13, 1900.
H. L. TREBERT.
FOLDING BICYCLE.
(Application filed July 28, 1898.)
(No Model.) 2 Sheets—Sheet 1.
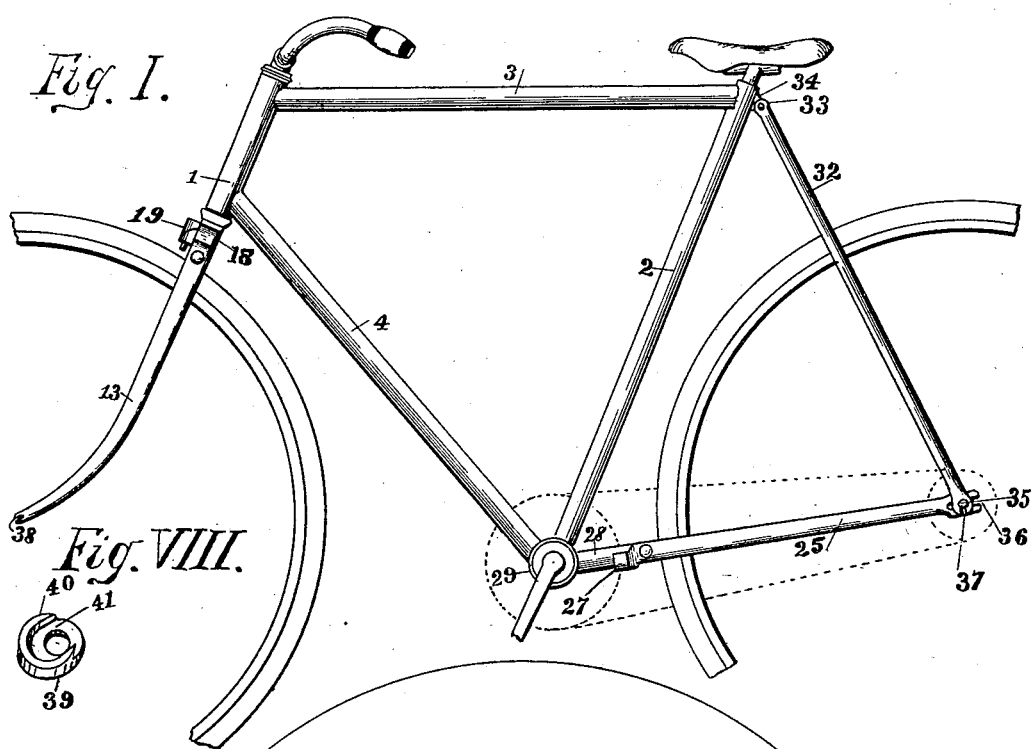
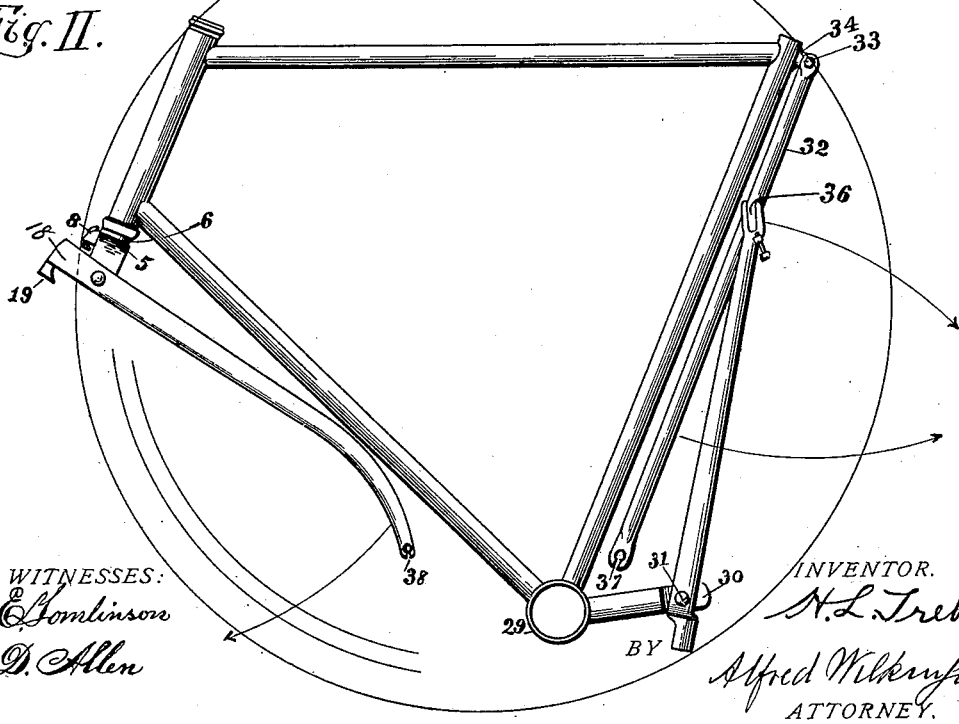
WITNESSES:
C. E. Tomlinson
A. D. Allen
INVENTOR.
H. L. Trebert
BY Alfred Wilkinson
ATTORNEY.

No. 645,145. Patented Mar. 13, 1900.
H. L. TREBERT.
FOLDING BICYCLE.
(Application filed July 28, 1898.)
(No Model.) 2 Sheets—Sheet 2.
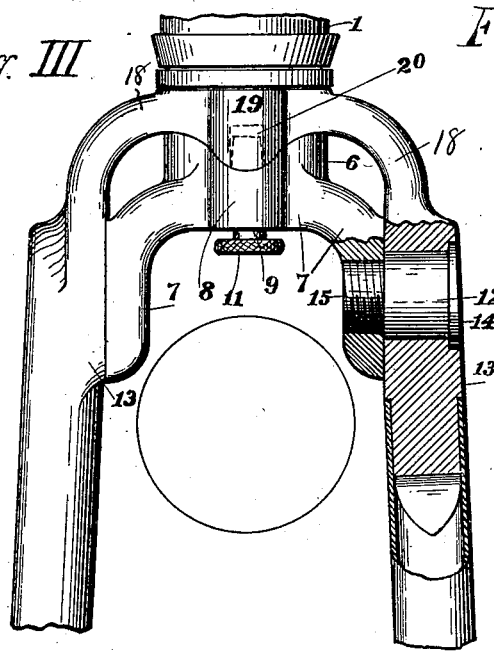
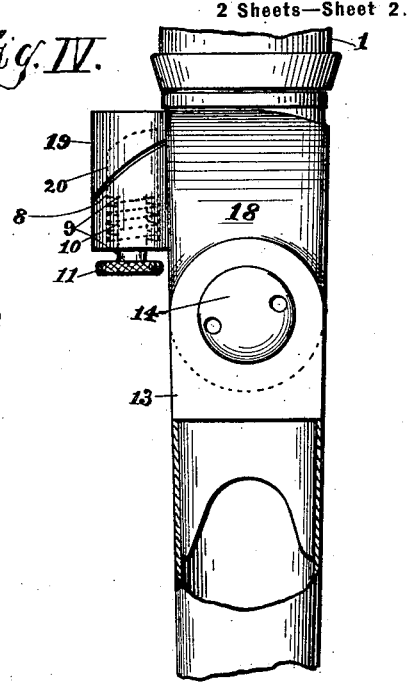
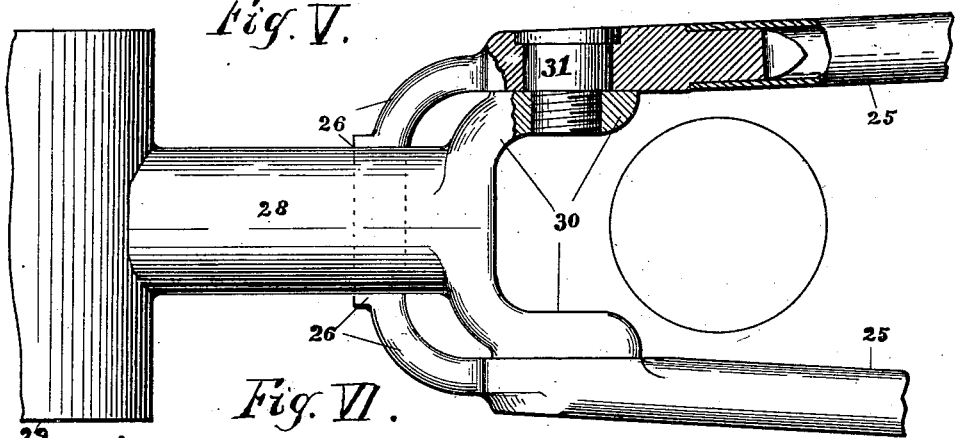
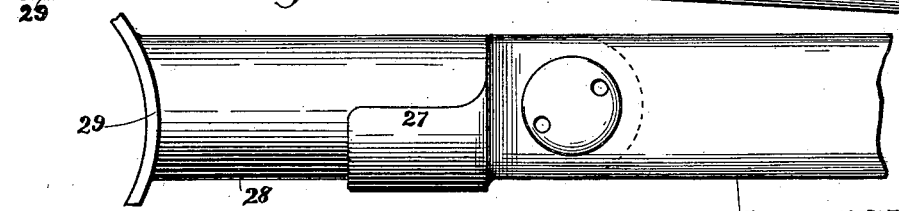
WITNESSES: INVENTOR.
H. L. Trebert
BY Alfred Wilkinson
ATTORNEY

UNITED STATES PATENT OFFICE.

HENRY L. TREBERT, OF SYRACUSE, NEW YORK, ASSIGNOR, BY MESNE ASSIGNMENTS, TO E. C. STEARNS & CO., OF SAME PLACE.

FOLDING BICYCLE.

SPECIFICATION forming part of Letters Patent No. 645,145, dated March 13, 1900.

Application filed July 28, 1898. Serial No. 687,142. (No model.)

*To all whom it may concern:*

Be it known that I, HENRY L. TREBERT, of Syracuse, in the county of Onondaga, in the State of New York, have invented new and useful Improvements in Folding Bicycles, of which the following, taken in connection with the accompanying drawings, is a full, clear, and exact description.

What I have invented is a new and simple construction of knockdown bicycle in which the front fork is jointed and hinged and the rear forks also jointed and hinged, so that when unlocked and folded against the main frame the whole frame may be set in a circle about the size of a wheel, making the whole bicycle convenient for packing and transportation.

I have embodied this invention in a certain detail construction here shown, which is strong, simple, and convenient and also as cheap and light as possible. In this construction the main stem terminates below the fork-crown in the form of an inverted U, to each leg of which is journaled on the outside one of the fork sides connected to each other by a truss or arch formed to fit the fork-crown snugly and cut out on its inner face to fit around the stem when swung into position. Either the fork-crown or the arch is provided with a spring-latch engaging with a bolt-hole in the other part, so that when the fork sides are turned into position they are held securely and are as strong as the strongest. The lower rear fork sides are of similar construction, but without the latch. The tube rearwardly extending from the crank-hanger is provided with arms or legs, corresponding in construction to the fork-crown, to which on the outside are pivoted the fork sides, connected by the rear arch, formed partially to encircle and to fit snugly the under side of said tube when the parts are turned into operative position. There is no necessity for a latch on this part of the frame, because the upper rear fork sides, which are secured by a pin to the upper end of the main tube, are swung out and securely connected to the lower rear fork sides by the axle carrying the rear wheel. The front forks and upper rear fork sides are formed with slots instead of holes to receive the axles and the front forks provided with peculiarly-formed washers covering and gripping the ends of the forks, so that when the nuts are loosened the wheels slip out easily, the lower rear fork sides and upper rear fork sides may be turned against the main tube, and the latch being disengaged in front the fork sides may be turned back against the bottom of the lower diamond tube. Then taking off the handle-bar, saddle, and pedals, the whole bicycle may be packed in a circular crate the size of a single wheel or may be tied together in convenient form for transportation.

My invention will be better understood by reference to the accompanying drawings, in which the same reference-numerals indicate the same parts in all the figures.

Figure I is a side elevation of a bicycle-frame constructed according to my invention, the parts being arranged in position for use. Fig. II is a similar elevation with the wheels removed and the forks turned in into position for packing. Fig. III is a front elevation of a portion of a bicycle, showing the fork-crown and the means for securing the fork sides thereto, portions being broken away and portions shown in section. Fig. IV is a corresponding side elevation. Fig. V is a top plan view showing the connection between the lower rear fork sides and the frame, portions being broken away and portions shown in section. Fig. VI is a corresponding side elevation. Fig. VII is a top plan view of the front fork with connecting-arch. Fig. VIII is a perspective view of the peculiar washer used on front axle.

In the figures, 1 indicates the front post; 2, the main post; 3 and 4, respectively, the upper and lower diamond tubes; 5, the fork-crown, integral with the stem 6 and provided with the legs 7 7 and with lug 8 for receiving the spring-latch 9, of which 10 is the spring and 11 the handle or thumb-piece. To the lower ends of legs 7 7, by bolts 12 12, are journaled the fork sides 13 13. These bolts may be constructed, as here shown, with flat heads 14 14, and on their inner ends screw-threads 15 15, engaging with screw-threads formed in the legs 7 7. These fork sides are connected by an integral arch 18, having a front lug 19, corresponding to lug 8 and formed with bolt-hole 20 for bolt of spring-latch. If desirable, the position of these parts may be reversed and spring-latch be applied to arch-lug above. The arch and its lug are formed to fit snugly into position, and the arch is cut out at 21 to fit around the stem.

The lower rear fork sides 25 25 are connected by a corresponding arch 26, formed with a curved center 27 to fit against under side of tube 28, rearwardly extending from crank-hanger 29. This tube 28 is provided with integral arms 30 30, to which are journaled the lower rear fork sides by means of bolts 31, similar to fork-crown bolts 12 12. When these lower rear fork sides are turned into position for use, they are held securely by the upper rear fork sides 32 32, which by a common construction are pivotally connected by pin 33 to lug 34 on the upper end of main post 2, the axle 35 being inserted through the slots 36 36 and 37 37, locking the parts securely in position.

The front forks are formed with slots 38 to receive the axle, which is provided with peculiar washers 39, having a rim 40, cut away at 41, fitting over the end of the front fork, clamping the axle and wheel securely in position. By the use of these peculiar washers and by forming the front and rear fork sides with slots it is easy to knock down the bicycle, to take off the wheels it being necessary only to loosen the front nuts and not to unscrew them from the axles entirely.

Having described my invention, what I claim as new, and desire to secure by Letters Patent, is—

1. In a folding bicycle-frame, the front forks hinged to swing back against the lower diamond tube, and the upper and lower rear forks hinged to swing forward against the main post, when the wheels are removed, and means to engage with the upper ends of the front forks to hold them in operative position.

2. In combination, in a folding bicycle-frame, the front forks hinged to swing back against the lower diamond tube, a spring-latch to hold them in operative position, and upper and lower rear forks hinged to swing forward against the main post when the wheels are removed.

3. In a folding or knockdown bicycle-frame, the combination of the steering-stem with depending legs, the front forks connected by an integral arch and pivotally secured to said legs, and a spring-latch secured to the lower end of said stem for engaging with a bolt-hole in said arch and holding the parts in operative position.

4. In combination, in a folding or knockdown bicycle, the steering-stem with integral depending legs, the front forks pivotally connected to said legs, an integral arch connecting said forks and rearwardly cut out to fit around said stem when swung into position, a spring-latch secured to the front of said stem and engaging with a bolt-hole in a lug on the front of said arch.

5. In combination in a folding or knockdown bicycle-frame, the steering-stem with integral depending legs forming an inverted U, the front forks pivotally secured to the outer face of said respective legs, an integral arch connecting said forks and formed on its inner face to fit around said stem when swung into position, a forwardly-projecting lug on the lower end of said stem, a corresponding forwardly-projecting lug on the front face of said arch, a spring-latch secured to one of said lugs and engaging with the bolt-hole formed in the other.

6. In combination, in a folding or knockdown bicycle-frame, the front forks hinged to swing back against the lower diamond tube, a spring-latch to hold them in operative position, and upper and lower rear fork sides hinged to swing forward against the main post when the wheels are removed, said front and rear forks being slotted at their lower and outer ends to receive the axles.

7. In a folding or knockdown bicycle-frame, in combination, the steering-stem with integral fork-crown and depending legs, the front forks connected by an integral arch and pivotally secured to said legs, a substantially-horizontal arm secured to the rear of the crank-hanger and having rearwardly-extending legs, lower rear forks pivotally secured to said rear legs, and an integral arch connecting said rear forks and formed to fit the lower surface of said arm when the forks are in operative position.

In testimony whereof I have hereunto signed my name.

HENRY L. TREBERT. [L. S.]

Witnesses:
A. D. ALLEN,
H. M. SEAMANS.